(12) United States Patent
Dismang

(10) Patent No.: US 10,085,438 B1
(45) Date of Patent: Oct. 2, 2018

(54) PORTABLE WILDLIFE CORRAL APPARATUS

(71) Applicant: William Dismang, El Paso, AR (US)

(72) Inventor: William Dismang, El Paso, AR (US)

( * ) Notice: Subject to any disclaimer, the term of this patent is extended or adjusted under 35 U.S.C. 154(b) by 276 days.

(21) Appl. No.: 14/811,775

(22) Filed: Jul. 28, 2015

(51) Int. Cl.
*A01K 3/00* (2006.01)
*A01M 23/02* (2006.01)
*A01K 1/00* (2006.01)
*E04H 17/18* (2006.01)
*G08B 21/18* (2006.01)

(52) U.S. Cl.
CPC ............ *A01M 23/02* (2013.01); *A01K 1/0035* (2013.01); *A01K 3/00* (2013.01); *E04H 17/18* (2013.01); *G08B 21/18* (2013.01)

(58) Field of Classification Search
CPC ......... A01K 3/00; A01M 23/16; A01M 23/18; A01M 23/20
USPC ........ 119/512–514, 519, 522, 524; 43/60–62
See application file for complete search history.

(56) References Cited

U.S. PATENT DOCUMENTS

| | | | | |
|---|---|---|---|---|
| 3,908,599 A * | 9/1975 | Flocchini | ............. | A01K 1/0029 119/510 |
| 4,048,959 A * | 9/1977 | Steele | .................. | A01K 1/0035 119/512 |
| 4,250,836 A | 2/1981 | Smith | | |
| 4,537,151 A * | 8/1985 | Bolton | ..................... | A01K 3/00 119/512 |
| 5,381,757 A | 1/1995 | Putney | | |
| 6,073,587 A * | 6/2000 | Hill | ....................... | A01K 1/0035 119/474 |
| 6,450,124 B1 * | 9/2002 | Calvert | .................... | A01K 3/00 119/512 |
| 9,545,094 B2 * | 1/2017 | Dykes | .................. | A01M 23/20 |
| 9,622,453 B2 * | 4/2017 | Wilson | ..................... | A01K 3/00 |
| 2009/0293340 A1 | 12/2009 | Kelley | | |
| 2010/0064572 A1 * | 3/2010 | Kurachi | ................ | A01M 23/08 43/61 |
| 2011/0120384 A1 * | 5/2011 | Wilson | ..................... | A01K 3/00 119/521 |
| 2011/0167709 A1 * | 7/2011 | Pinkston | ............... | A01M 23/20 43/61 |
| 2011/0180012 A1 | 7/2011 | Meyer, Jr. | | |
| 2013/0205645 A1 | 8/2013 | Gaskamp et al. | | |
| 2015/0296766 A1 * | 10/2015 | Gaskamp | .............. | A01M 23/22 43/61 |
| 2015/0334987 A1 * | 11/2015 | Schwartz | ................ | E04H 17/00 119/514 |

* cited by examiner

*Primary Examiner* — Peter M Poon
*Assistant Examiner* — Danielle A Clerkley
(74) *Attorney, Agent, or Firm* — Rashauna Norment

(57) ABSTRACT

An improved portable wildlife corral apparatus is used for capturing and containing wildlife. The apparatus has a frame; at least one selectively remotely controlled gate; at least one panel assembly; a plurality of lightweight panel members collapsible and foldable against the frame during nonuse, with the panel members being interchangeable with the gates on the panel assembly; and a monitoring system that monitors and alerts a user whenever wildlife enters the corral. When unfolded, the panel members may be easily configured to form one or more corral pens or panel sections by a single person. The apparatus further includes a detachable top cover of panel members that prevents wildlife from escaping from the top of the apparatus.

10 Claims, 12 Drawing Sheets

PORTABLE WILDLIFE CORRAL APPARATUS

CROSS-REFERENCE TO RELATED APPLICATION

Not applicable.

FEDERALLY SPONSORED RESEARCH AND DEVELOPMENT

Not applicable.

BACKGROUND OF THE INVENTION

1. Field of the Invention

The present Invention generally relates to portable wildlife corrals. More particularly, the Invention relates to a portable wildlife corral apparatus having at least two panel assemblies extendable from a frame, with each of the panel assemblies having a plurality of selectively interchangeable panel members or gates configured to form one or more corral sections, at least one remotely controlled gate assembly, and a monitoring system for monitoring and alerting a user to the presence of wildlife entering the corral. The apparatus further includes a detachable top cover to prevent wildlife animals from escaping over the top of the panel assemblies.

2. Description of Arguably Related Art Including Information Disclosed for 37 CFR 1.97 and 1.98

"Nuisance wildlife animals" refer to animals that are considered pests or a nuisance in a location, such as due to overpopulation of the offending wildlife. The wildlife animals discussed herein, and more particularly, the nuisance wildlife animals sought to be captured, includes, without limitation, feral hogs, deer, geese, or any other nuisance animal in need of containment and/or relocation from the area. One common method for catching and containing nuisance wildlife animals is to install a corral in an area most likely to be travelled by the wildlife animals. Typically, the corral may have one or more corral pens (or sections) to further selectively segregate the animals. A suitable trap is set inside or near the entrance(s) of the corral. The trap may include food or live bait, depending on the wildlife animals to be captured. As the wildlife congregates inside the corral pens, a user may cordoned off the pens by urging the wildlife to a holding area or other location in the corral before closing off the pens with a gate or other access point. The wildlife animals may then be transported from the field in a transport vehicle.

U.S. Pat. No. 5,381,757 issued to Putney discloses a portable, collapsible livestock corral having a trailer with a rear wheel assembly, a winch mechanism, a plurality of hinged panels, and at least one gate. The conventional gates must be manually operated and are pivotably attached to vertical beams to form separate corral pens for isolating different livestock. The panels are pivotably attached to each other on a hinge point, and are capable of horizontal and vertical movement. The panels are secured together with a chain-bar latch.

Patent Application Publication No. 2013/0205645 filed by Gaskamp et al. discloses a corral system for trapping animals. This corral includes an enclosure suspended over a trap and held into position with a cable. The corral system includes a camera and a communications system to transmit video feed of the trap area to the user. After a user determines that enough animals have entered the corral, the user communicates a drop signal via a wireless device to actuate a release mechanism to drop the enclosure to the ground.

The references do not disclose, teach, or suggest a portable corral apparatus for trapping wildlife animals, wherein the apparatus has at least one remotely controlled drop gate; a monitoring system for monitoring and alerting a user to the presence of wildlife in the corral; at least one panel assembly, with each panel assembly having a plurality of foldable, stackable, and collapsible panel members, with each panel member having an interchangeable lining, and with each panel member being selectively interchangeable with one or more gates. Solar technology is the preferred power source for the apparatus' components.

Problems still arise with the currently modified portable corrals for capturing wildlife. Some of these corrals are cumbersome and difficult for quick assembly by one person. Other corrals are not mountable or easily connectable onto a trailer frame for easy storage and transport. Still other corrals lack drop gates that can be selectively remotely controlled or lack cameras with motion sensors and infrared technology to alert a user to the presence of wildlife animals in the corral. Some corrals have heavy panel members and gates that pose a risk to the user during unloading and installation when the user is working alone. In these corrals, the panel members and the gates are not easily interchangeable for customization of the corral. Furthermore, those panel members and gates must be assembled together in a particular configuration for proper use of the corrals. Some panel members of these corrals do not have a sturdy middle, interchangeable section (or lining) to easily convert the corral to accommodate capturing different wildlife animals. The corrals further lack a detachable top cover; therefore, smaller or flying wildlife animals can easily escape from the corral or otherwise injure itself. Further still, due to some of the components of some corrals, these corrals also require that it be installed in the field for a long period of time.

Therefore, a need exists for an improved portable wildlife corral apparatus that has at least one lightweight, sturdy, foldable and stackable panel assembly, with each of the panel assemblies having selectively interchangeable gates or panel members; at least one drop gate assembly controlled by a wireless or remote communications system; and a monitoring system for monitoring and alerting a user to the presence of wildlife animals in the corral pen.

A need exists for an improved portable wildlife corral apparatus that uses sensor technology, infrared technology, and video capturing for detecting the presence of wildlife in the corral during the day or night.

A need exists for an improved portable wildlife corral apparatus that is easy to assemble in the field by a single user into a customized configuration of panel members and gates to form one or more corral sections or pens.

A need exists for an improved portable wildlife corral apparatus that has a convertible lining for each panel member.

A need exists for an improved portable wildlife corral apparatus that has a removable top cover having a plurality of panel members or netting for converting the apparatus to capture wildlife animals that are capable of flight, leaping, or climbing over the panel assembly.

A need exists for an improved portable wildlife corral apparatus that has at least one panel assembly that is stackable, collapsible, and foldable against a frame for storage or for transporting the apparatus.

SUMMARY OF THE INVENTION

In general, the present Invention provides an improved portable wildlife corral apparatus comprising (including or having) a frame; at least one panel assembly (or section) being extendable from and supported by the frame, with the panel assembly having an arrangement of a plurality of panel members (or walls) forming a corral pen; at least one gate assembly having a gate and a controlling means for remotely controlling the gate; and a monitoring system having a sensing means for sensing, monitoring, and alerting a user to the presence of wildlife animals entering the corral pen(s), and a transmitting means for transmitting an alert to a receiving means.

In another embodiment, the improved portable wildlife corral apparatus comprises:

a. a frame that has at least one lifting means for lifting or lowering the frame;

b. at least one panel assembly that is extendable from and supported by the frame, with each panel assembly having an arrangement of a plurality of panel members forming a corral pen, each of the panel members is foldable, stackable, and collapsible upon each other in a closed position or is, alternatively, unfoldably extended outwardly into an opened position;

c. at least one gate assembly has a gate, a suspension means for suspending the gate above the ground, and a controlling means for remotely controlling the gate; and d. a monitoring system that has a sensing means for sensing and alerting to the presence of wildlife animals entering the corral pen, and a transmitting means for transmitting an alert to a receiving means.

In yet another embodiment, the improved portable wildlife corral apparatus comprises:

a. a frame that has a front lifting means and a rear lifting means for lifting or lowering the frame, with each of the front lifting means and the rear lifting means independently moving the frame;

b. at least one gate assembly that has an upstanding gate frame defining two opposing channels, a gate, with the gate having a plurality of rolling members slidable within the channels, a locking mechanism, a suspension means for suspending the gate above the ground, and a controlling means for remotely controlling the locking mechanism and the position of the gate;

c. two panel assemblies, each of the panel assemblies is extendable from and supported by the frame, each of the panel assemblies has an arrangement of a plurality of panel members forming a corral pen, each of the panel members is foldable, stackable, and collapsible upon each other in a closed position or is unfoldably extended outwardly into an opened position, each of the panel members and the gate assembly has at least one fastener for detachably fastening each of the panel members or the gate in an arrangement of each of the panel assemblies, with any of the panel members being selectively interchangeable with one or more of the gates an arrangement of each of the panel assemblies;

d. a monitoring system that has a sensing means for sensing and alerting to the presence of wildlife animals entering the corral pen, and a transmitting means for transmitting an alert to a receiving means; and e. a detachable, removable top cover has of a plurality of panel members or at least one netting, a plurality of fasteners for fastening the top cover to one or more of the panel members or the gates, the top cover for enclosing the top opening of the corral pen to prevent wildlife from escaping over the top of the panel assemblies, with the top cover being in communication with the controlling means for selectively lowering the top cover within the corral pen.

The frame includes a front wall, a rear wall, a header, and at least one lifting means for lifting and lowering the frame. The frame may further include a rear wheel assembly and a towing assembly to facilitate transporting the apparatus to and away from the field. Each panel assembly has a plurality of panel members that are each foldable, collapsible, and stackable upon the other when in a closed position. One or more of the panel members may be removed from the arrangement of panel members on the panel assembly and exchanged with a gate assembly or another panel member. The monitoring system uses sensor technology, infrared technology, and video capturing for detecting the presence of wildlife in the corral during the day or night. An alert is transmitted to the user who may then send a signal to the gate assembly to selectively drop a gate.

Once unfolded, each panel assembly is configured to form one or more corral pens (or sections) by a single person by either connecting the farthest panel member in the panel assembly to an opposite end of the frame or to the farthest panel member of a different panel assembly. One or more gates, each selectively and remotely controlled by the components in the gate assembly, are located and suspended in an open position. The lining of each panel member may be easily changed to accommodate capturing and containing different wildlife animals. A detachable top cover of panel members or netting may also be used with the apparatus to prevent geese, deer, or other leaping or flying wildlife animals from escaping over the panel walls.

It is an object of the invention to provide an improved, lightweight, sturdy, portable wildlife corral apparatus having at least one panel assembly having a plurality of foldable panel members; at least one gate assembly having a drop gate controlled by a wireless or remote communications system, with each panel assembly having an arrangement of panel members, with any of the panel members being selectively interchangeable with a gate in the panel assembly arrangement; and a monitoring system for monitoring and alerting a user to the presence of wildlife in the corral.

It is another object of the invention to provide an improved portable wildlife corral apparatus that uses motion sensors and an infrared technology for detecting the presence of wildlife animals in the corral during the day or night.

It is another object of the invention to provide an improved portable wildlife corral apparatus that is easy to assemble in the field by a single user into a customized configuration of panel members and gates to form one or more corral pens.

It is yet another object of the invention to provide an improved portable wildlife corral apparatus that has a removable top cover, with the top cover having a plurality of panel members or netting to capture wildlife animals that are capable of flight, leaping, or climbing over the panel members.

It is yet another object of the invention to provide an improved portable wildlife corral apparatus that has each panel assembly being stackable and foldable in a closed position against a frame for transporting the apparatus.

It is another object of the invention to provide an improved portable wildlife corral apparatus that has a frame having a lifting means for lifting and lowering the frame, and a towing means and a rear wheel assembly for facilitating transport of the apparatus.

These and other aspects, features, objects, embodiments, and advantages of the present invention will become apparent from the accompanying drawing and the following detailed description of the invention.

BRIEF DESCRIPTION OF THE SEVERAL VIEWS OF THE DRAWING

The Invention may be more readily described by reference to the accompanying drawing figures and the following description of the drawing figures. The reference numbers apply to each embodiment of the invention. In the drawing.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Figure 1:
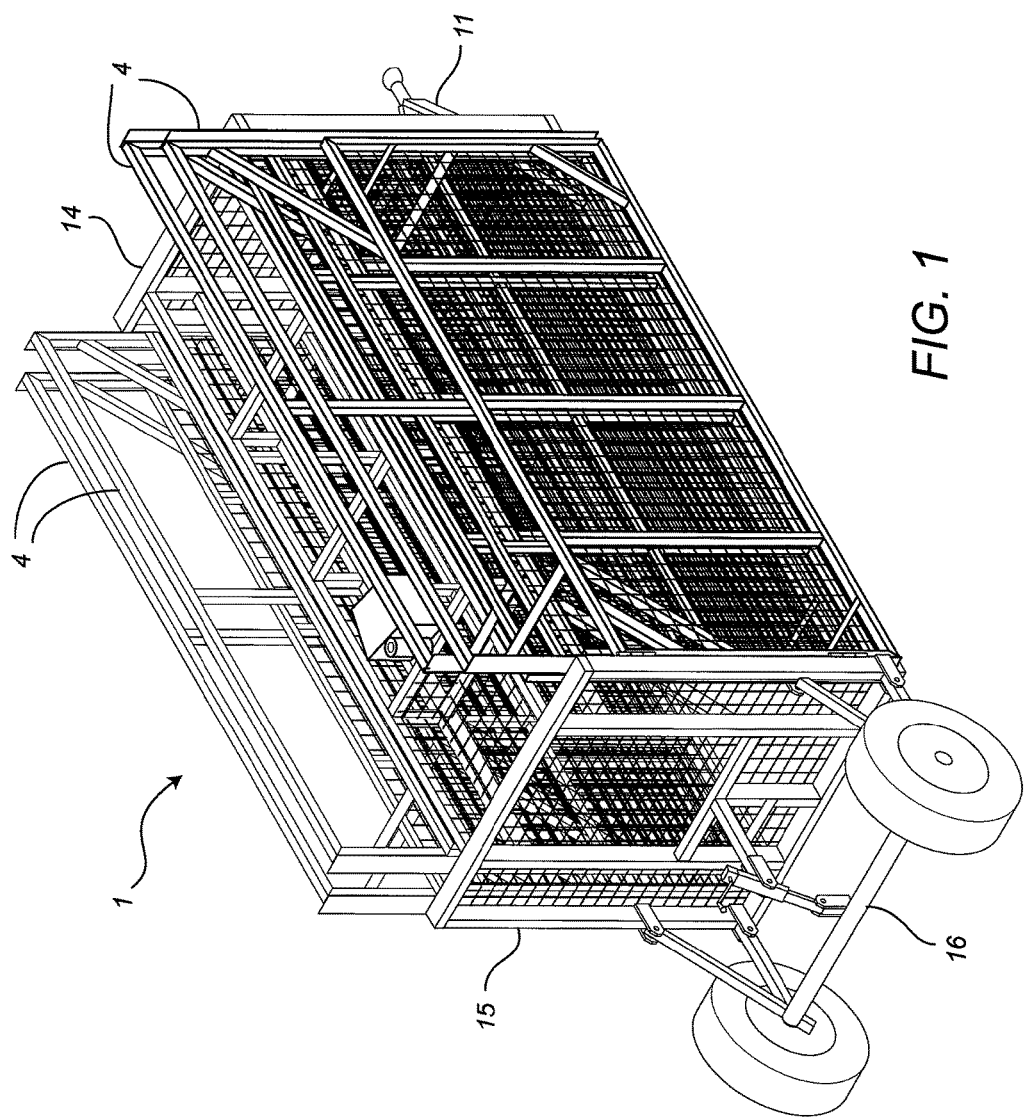
FIG. 1 is a perspective view of an embodiment of an improved portable wildlife corral apparatus, showing two panel assemblies in a closed position against a frame.
Figure 2:
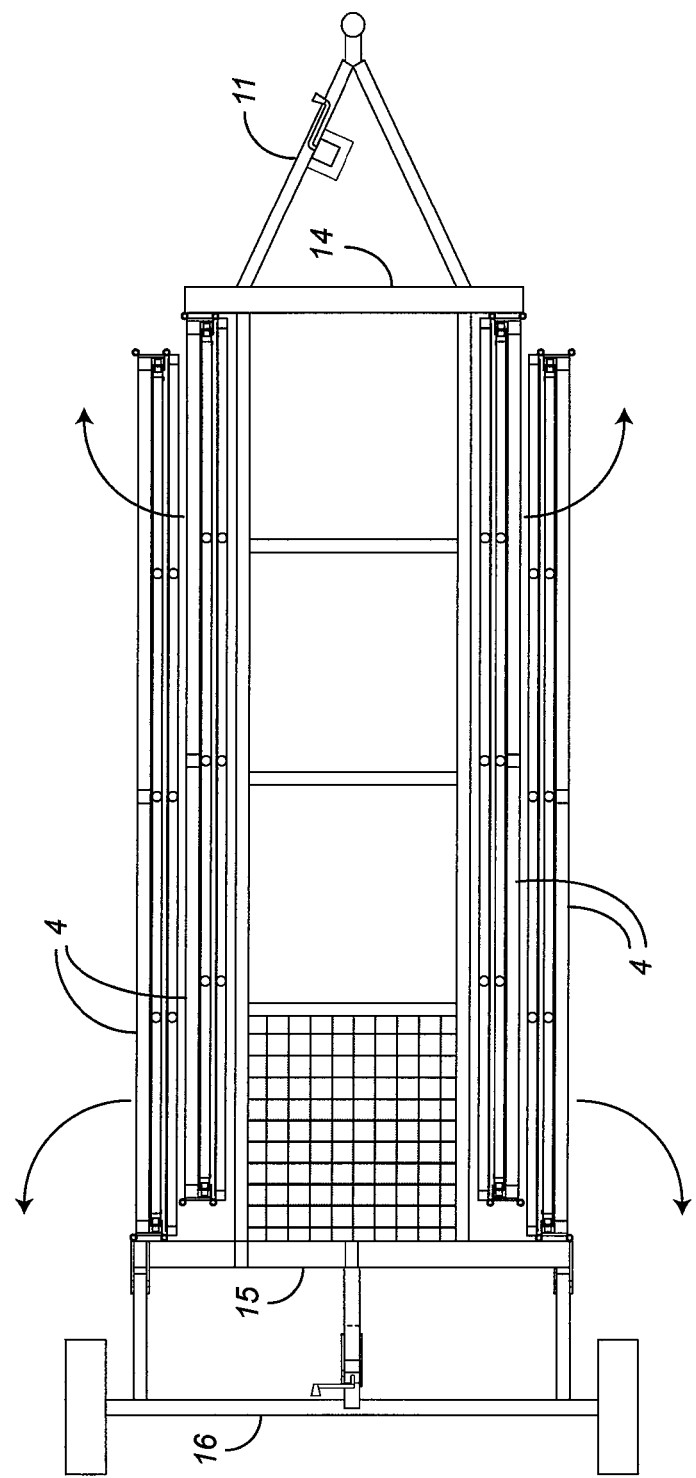
FIG. 2 is a top plan view thereof.
Figure 3:
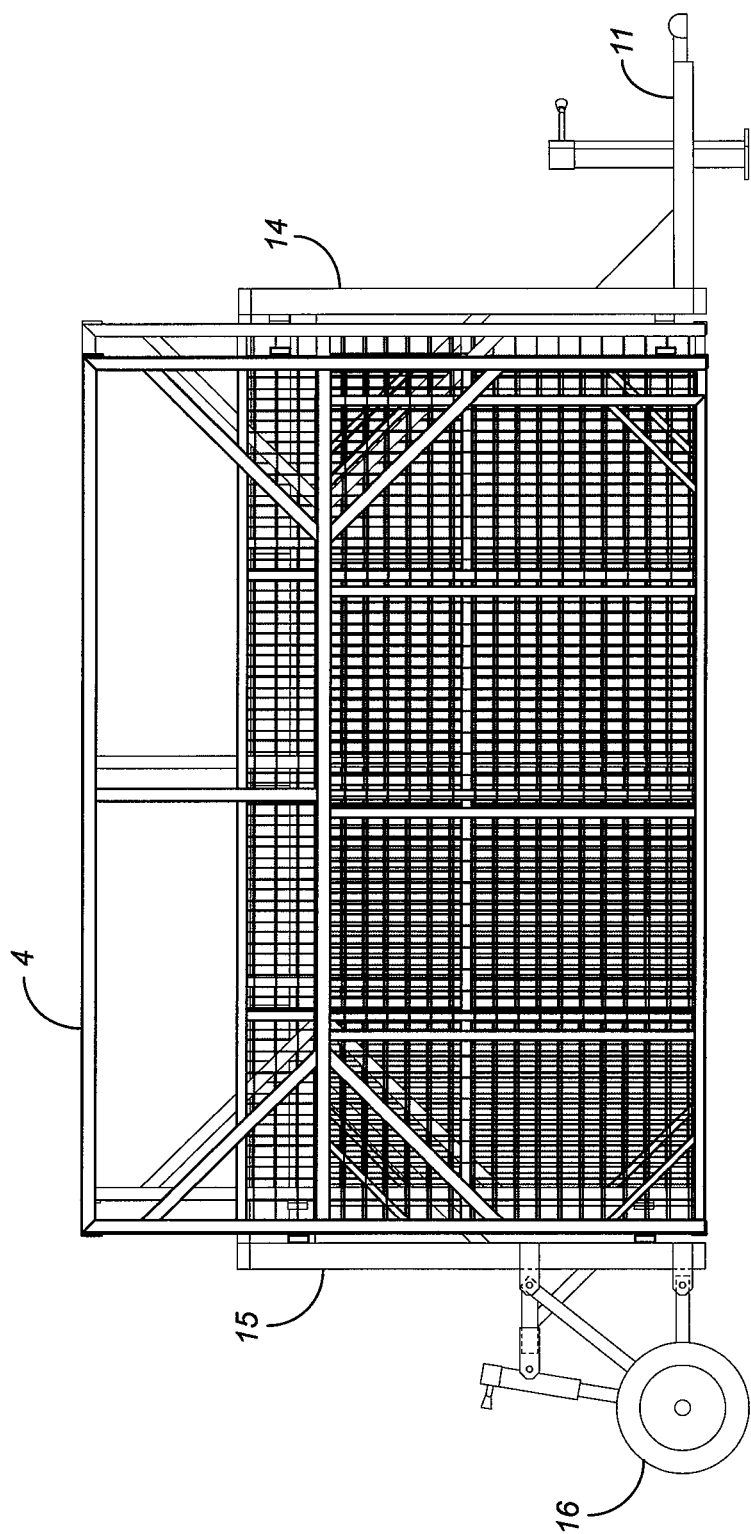
FIG. 3 is a left side elevation view thereof, with the right side elevation view being a mirror image of the left side elevation view.
Figure 5:
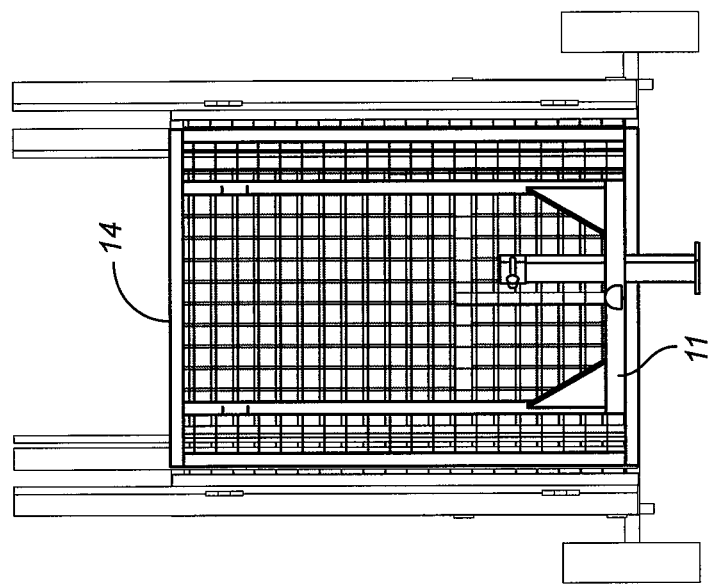
FIG. 5 is a front elevation view thereof.
Figure 4:
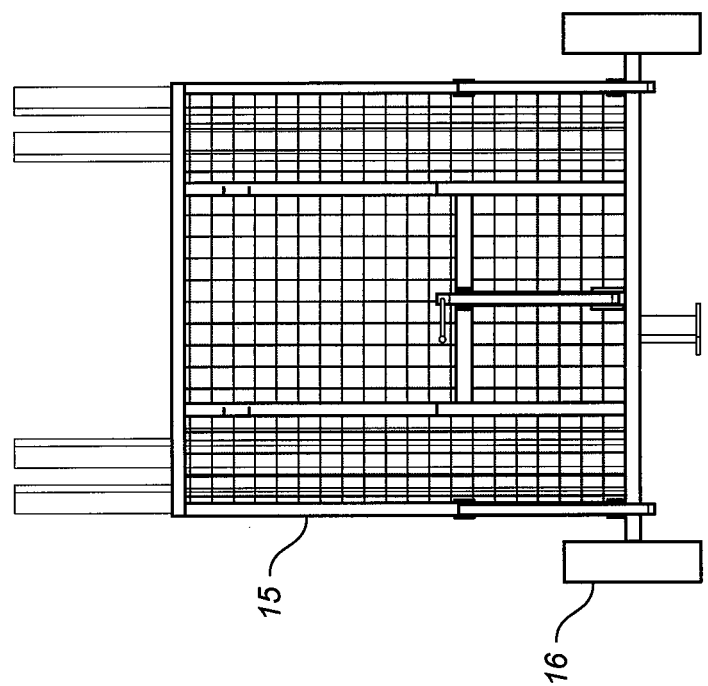
FIG. 4 is a rear elevation view thereof.
Figure 6:
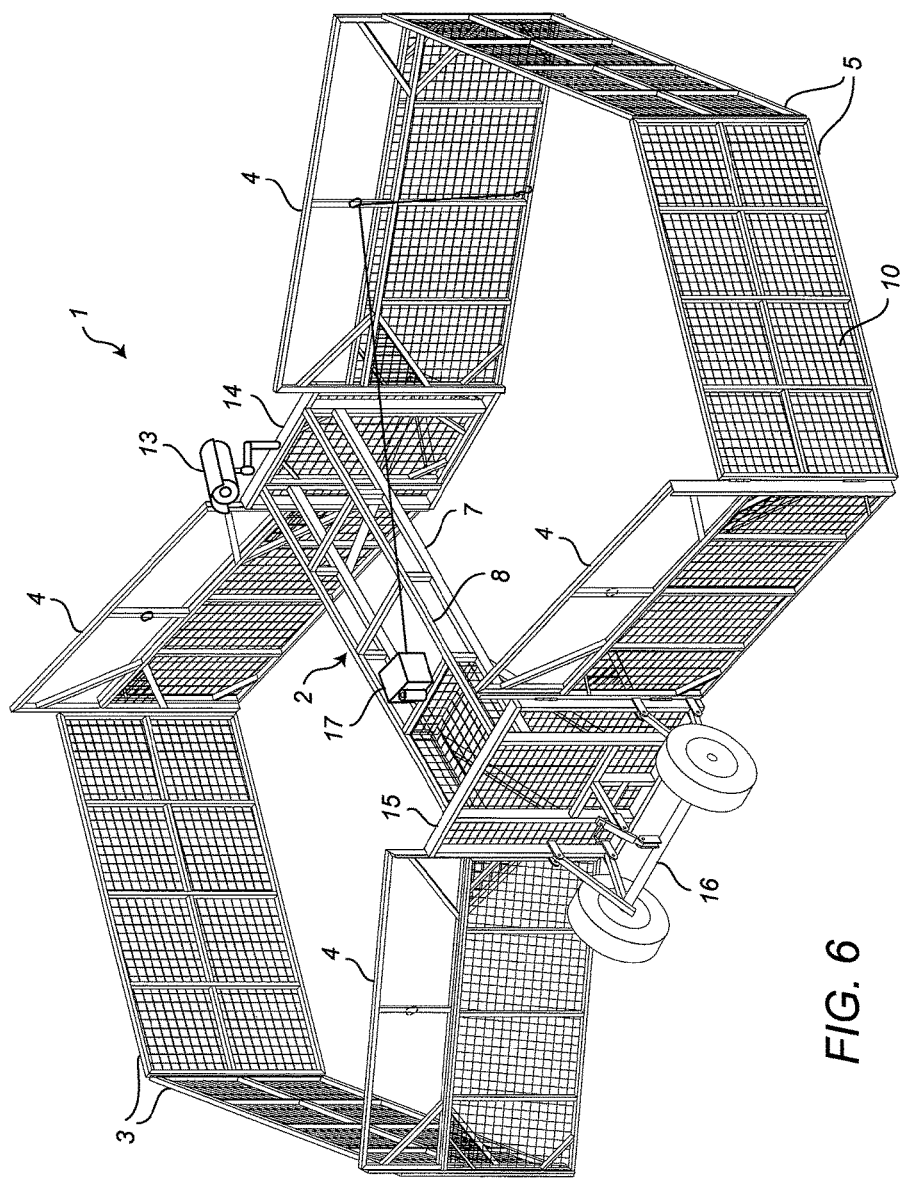
FIG. 6 is another perspective view of FIG. 1, with each of the panel assemblies being unfolded into an open position and configured to form two corral pens.
Figure 13:
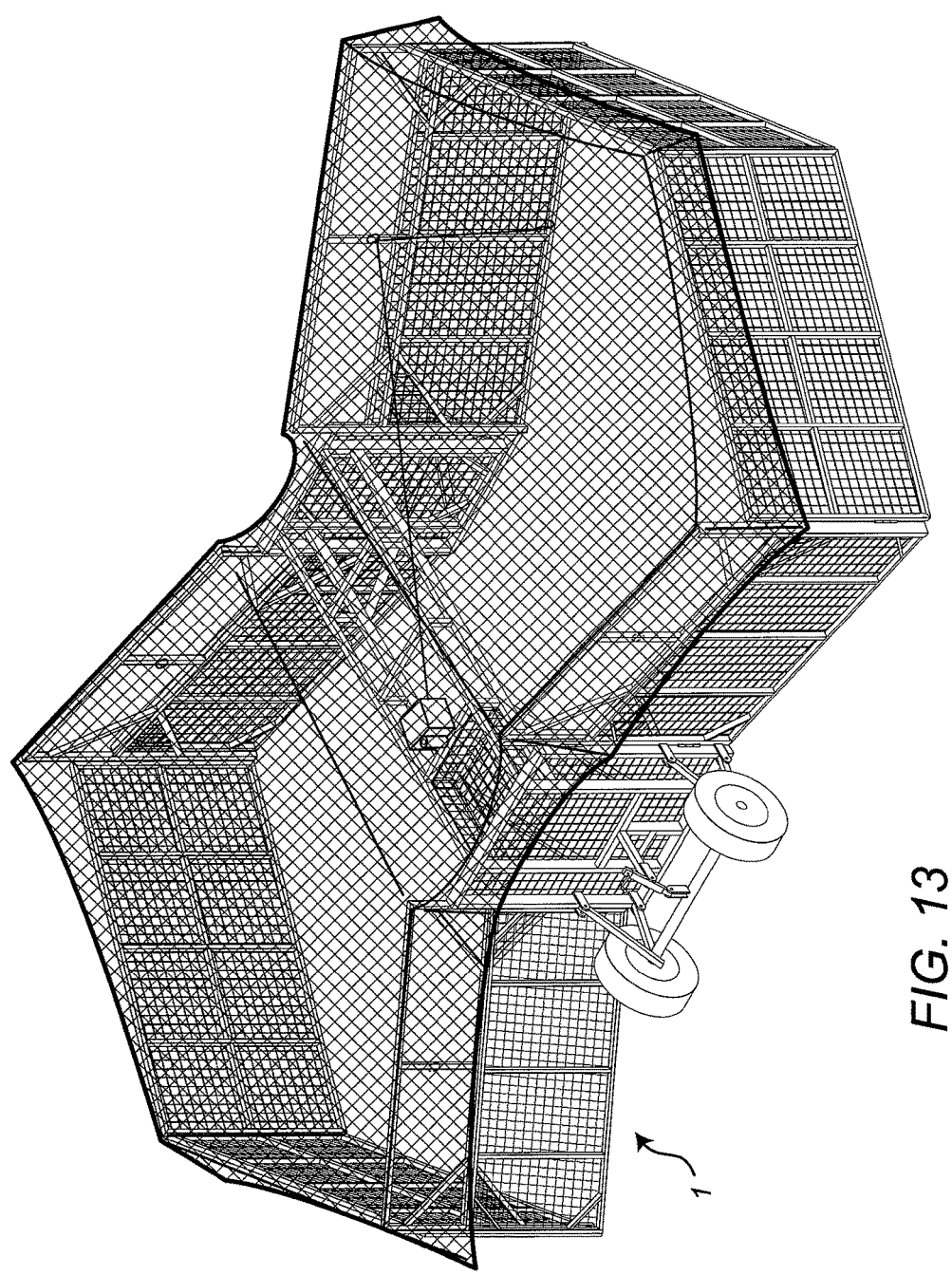
FIG. 13 is another embodiment of FIG. 6, showing a top cover installed over the apparatus.

Referring more particularly to the drawing figures by characters of reference, FIGS. 1-5 illustrate an improved portable wildlife corral apparatus 1 in its closed, stacked, collapsed, and folded position. In a general embodiment of the Invention, the apparatus 1 comprises (includes or has) a frame 2; at least one panel assembly 3, with each panel assembly 3 being extendable from and supported by the frame 2 to form one or more corral pens, enclosures, or sections; at least one gate assembly having a gate 4; a plurality of panel members 5, with each panel assembly 3 having an arrangement of panel members 5, with any of the panel members 5 being selectively interchangeable with one or more gates 4; and a monitoring system, as shown in FIG. 6, for monitoring and alerting a user to the presence of wildlife entering one of the corral sections. The frame 2 further includes a towing assembly 11 and a rear wheel assembly 16. When each of the panel assemblies 3 are collapsed, folded, and stacked against the frame 2 in a closed position, the apparatus 1 can be easily stored or transported to a different location with the towing assembly 11 connected to a vehicle (not shown). Fasteners, a chain, or a lock (not shown) may be used to keep the collapsed panel assembly abutting the frame. As illustrated in FIG. 13, the apparatus 1 further includes a top cover that covers the top opening of the apparatus 1 to prevent wildlife from leaping, flying, or otherwise escaping over the top of the panel assemblies 3. The structural components of the apparatus should use materials that are study and durable to withstand the harsh conditions resulting from use in the field or from transporting the apparatus. Based on the design of the apparatus, sturdy materials for the panel members and for the gates may be used because the user is not required to physically lift each gate or panel member.

Figure 11:
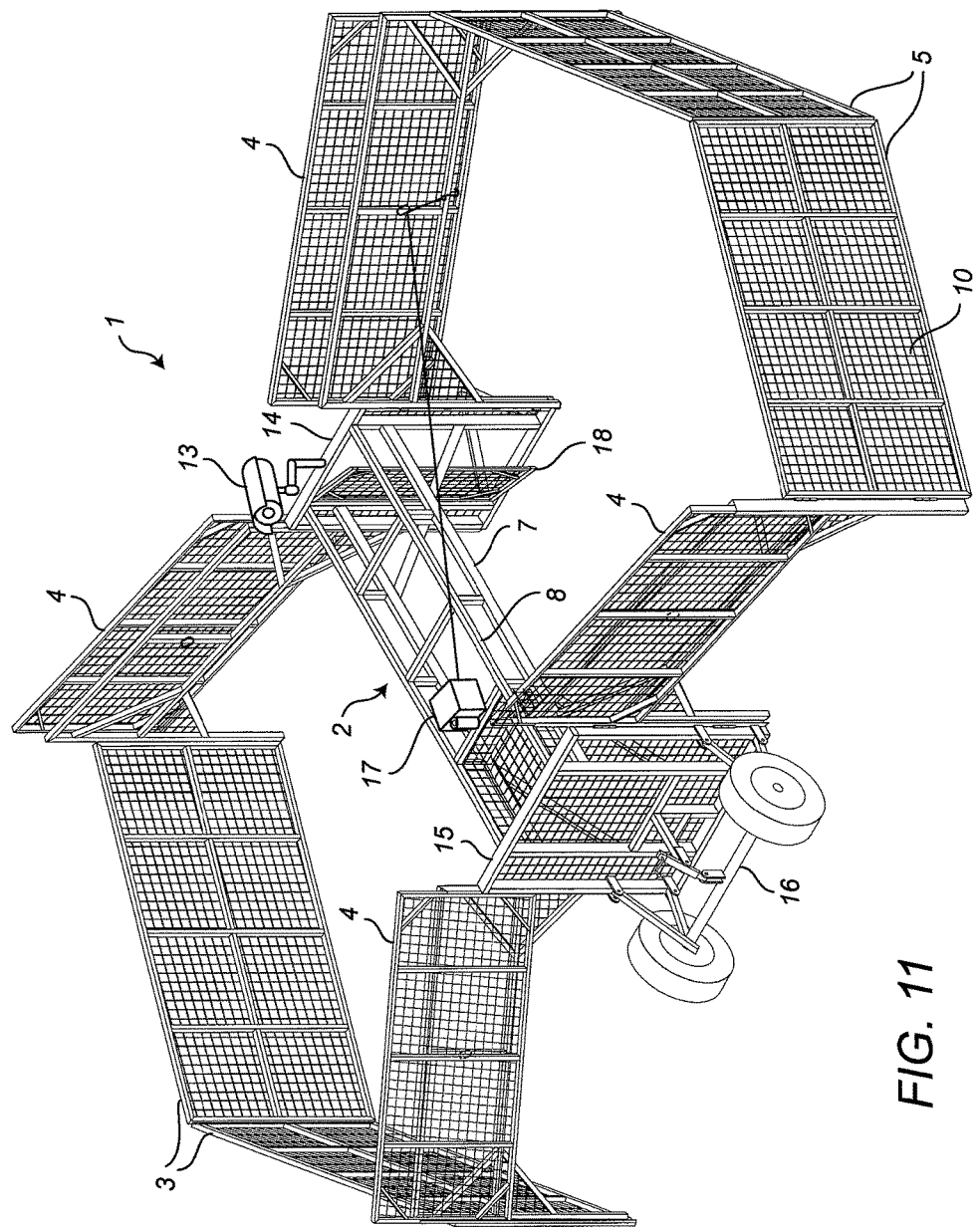
FIG. 11 is another perspective view of FIG. 6, with the gates shown in an open and suspended position.

FIGS. 6 and 11 depict the frame 2 comprising an upstanding front wall 14, an upstanding rear wall 15, a header 7, and one or more lifting means (not shown) for lifting the frame 2 away from or lowering the frame 2 toward the ground. The header 7 includes a first support member 8 and a second support member 8. The header 7 acts as a joist between the upstanding front 14 and upstanding rear 15 of the frame 2 to form a substantially rectangular structure. The frame 2 may further include a rear wheel assembly 16 and a front towing assembly 11 for connecting the apparatus 1 to a vehicle for transporting the apparatus 1 to and away from the field.

The length of the frame 2, and more particularly, the length of the header 7, may have different lengths, depending on the user's needs and requirements for the size of the corral pens. Preferably, the frame 2 has a length of approximately 10 feet to 20 feet. A frame having a length of 15 feet or more allows use of wider gates or panel members, which creates a larger corral enclosure while employing fewer numbers of panel members or gates. The structural parts of the frame may be made from tubing, steel I-beam, or any other suitable material that is durable for continued use, strong enough to support the apparatus regardless of whether the panel assemblies are in a closed position or in an opened position, and for lightweight transport and use. Preferably, the frame is made from 2×4×⅛ inch tubing, gusseted by 2×2 inch tubing for strength. Alternatively, the frame may be made from 2×2×⅛ inch tubing, gusseted by 2×2 inch tubing for strength. The combined components of the apparatus 1 provide for easy installation and disassembly in the field by a single user in approximately 10 minutes, subject to a substantially level, unencumbered terrain. The user does not have to physically pick up and install individual panel members or gates when configuring the corral pen.

The front 14 of the frame 2 has an upstanding wall 14 and a front lifting means (not shown). FIGS. 6 and 11 illustrate an embodiment wherein the front upstanding wall 14 has a lining 10 spaced apart between vertical beams. The vertical beams are sandwiched at its upper and lower ends by horizontal beams, respectively. The upper ends of the vertical beams and the upper horizontal beam are anchored to one end of the frame header 7. The upstanding wall may further include a man gate 18 and a ladder (not shown) to provide an additional means for user access. The frame may be raised or lowered when the panel assemblies are in its closed position or in its opened position. The frame may be raised or lowered at either or both the front and rear ends of the frame. The front lifting means facilitates lifting and lowering the front 14 of the frame. In a preferred embodiment, the front lifting means uses a conventional jack assembly and an axle, similar to a trailer screw jack, and a lever to move the jack assembly upwardly or downwardly.

The rear 15 of the frame 2 also has an upstanding wall 15 and a rear lifting means (not shown). In an embodiment shown in FIGS. 1, 6, 9, 10, and 11, the rear upstanding wall 15 has a lining 10 flanked by spaced apart vertical beams. The vertical beams are sandwiched at the upper and lower ends by horizontal beams, respectively. The upper ends of the vertical beams and the horizontal beam are anchored to a rear, opposite end of the frame header 7. The rear upstanding wall may further include a man gate (not shown) and a ladder (not shown) to provide yet another means for user access. The rear lifting means allows the rear end or back portion of the frame 2 to be independently raised or lowered. In a preferred embodiment, the rear lifting means is a conventional jack assembly, an axle (not shown), and a lever (not shown). The front and rear of the frame 2 pivot about each axle upon action on each lever on each jack assembly to move the frame upwardly or downwardly.

In the embodiment wherein the frame 2 is part of a trailer or is otherwise capable of being towed, the front end 14 of the frame 2 further includes a towing assembly 11, and the rear end 15 of the frame 2 further includes a rear wheel assembly 16. The towing assembly and the rear wheel assembly allow the apparatus to be towed or otherwise transported to the desired location in the field. The rear wheel assembly 16 is affixed at the rear of the frame 2. The rear wheel assembly 16 includes a conventional plurality of wheels and an axle. Tail lights (not shown) may also be installed on the frame. After the frame is positioned in the field, the rear wheel assembly cooperates with the rear lifting means so that the rear of the frame is pivoted downwardly or upwardly with a manual jack, electric jack, or hydraulic cylinders. The wheels rotate upwardly so that the frame may be lowered to the ground. The towing assembly includes a conventional tongue and a ball hitch to connect the trailer and the frame to a transport vehicle.

Each of the front and rear jack assemblies may be a manual hand jack, battery powered jack, or an electrically powered jack used in conjunction with an axle and a lever. In an embodiment wherein the jack is a manual hand jack, a 6000# side hand jack is recommended. In an embodiment wherein the jack is electrically powered, a 12-volt electric jack coupled to a power source or power supply is recommended. The front jack assembly (not shown) may be mounted or welded onto the frame near or at the middle of the front end wall. The rear jack assembly (not shown) may be mounted onto the frame at or near the rear end wall, or alternatively, may be further detachably fastened to the rear axle with a fastener. Each lifting means is simple and easy enough for a person to operate alone and without assistance from additional tools.

One of the main objects of the apparatus 1 is to provide a gate 4 or opening that is wide enough so wildlife animals will enter the corral pen more willingly. To facilitate this purpose, the rear axle 16 is located at the back of the frame 2 and the frame's structural support is accomplished with the overhead header 7 rather than employing lower lateral supports, as shown in FIG. 11. Therefore, after the gate(s) 4 is suspended above the ground and the panel assemblies 3 are unfolded and configured, there is no lower bracing, bar, or other beam for a wildlife animal to hit its feet upon when crossing the threshold under the header 7 into the corral pen. Having an overhead header 7 is advantageous because it prevents wildlife from being spooked away from the pen, or otherwise prevents hindering passage into the pen.

Each support member 8 is located on, or otherwise incorporated into, each lateral side of the frame header 7. Each support member 8 supports the weight of the panel assemblies 3. Alternatively, the weight of the panel assemblies 3 are supported on or by the front end wall 14 and rear end wall 15, respectively, as shown in the drawing figures. When the panel assemblies 3 are in the closed position, each set of panel members 5 are stacked, folded, and collapsed together and abut each respective support member 8 or the respective frame 2 end walls 14, 15. Each support member or each end wall further acts as an anchor support when the anchor panel members are unfolded into corral pens or sections.

Each panel assembly 3 is supported and movably connected to a respective support member or to the front end wall 14 and rear end wall 15 on each respective side of the frame 2, as shown in FIGS. 1, 6, 7, 11, 12, and 13. Each panel assembly 3 essentially comprises an arrangement of one or more panel members 5 or one or more gates 4, each movably connected to the other. The panel members may hingedly, pivotably, or rotatably move in relation to each other panel member. Preferably, the panel members are hingedly connected to each other. In an embodiment, any of the panel members 5 can be removed and interchanged with a gate 4 to further customize the configuration of the apparatus 1. Where needed for clarity, the panel assembly refers to the collection of either a plurality of gates only or a plurality of panel members only, or to a combination of panel members and gates in any arrangement. Each set of panel members 5 may be selectively unfolded and arranged to form one or more corral pens by fastening the farthest panel member to the frame or to another panel member (or gate) of another panel assembly. At least two corral sections or holding pens is preferred.

Figure 7:
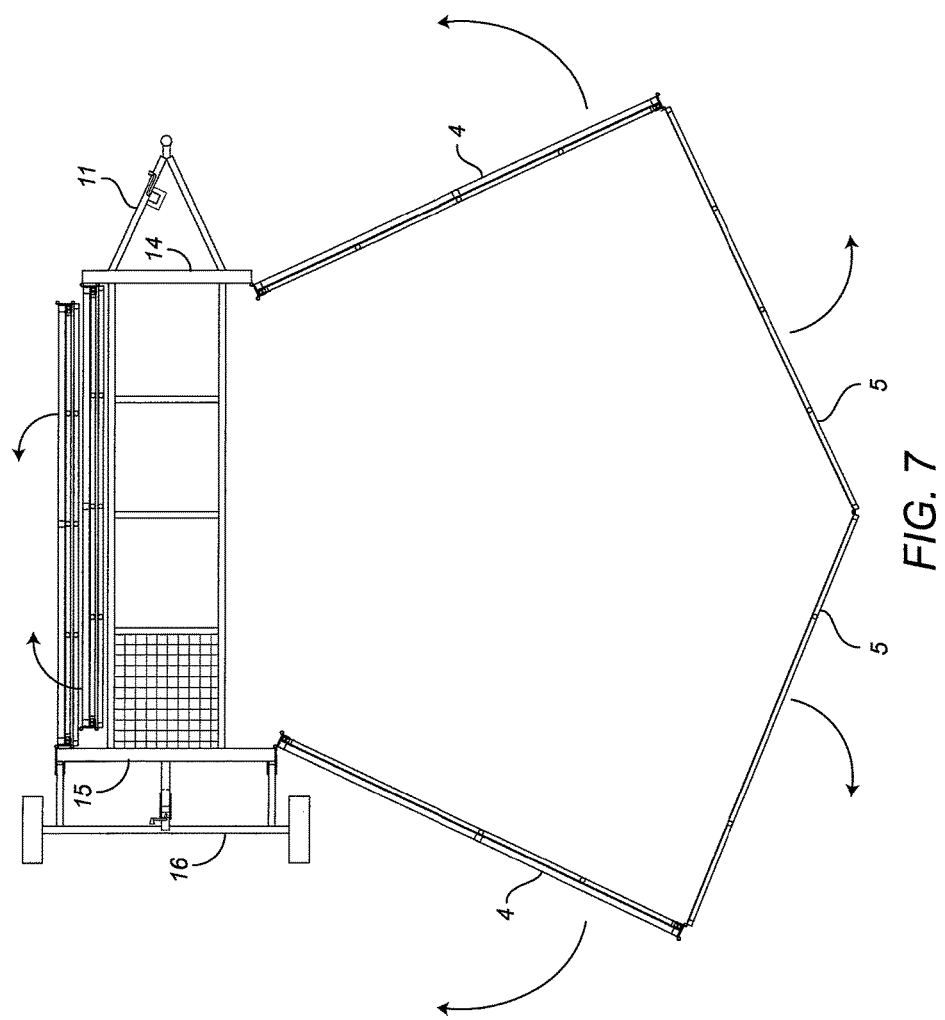
FIG. 7 is a top plan view of FIG. 6, with a first panel assembly shown in a closed position, and a second panel assembly shown unfolded in an open position and configured to form a corral pen.
Figure 8:
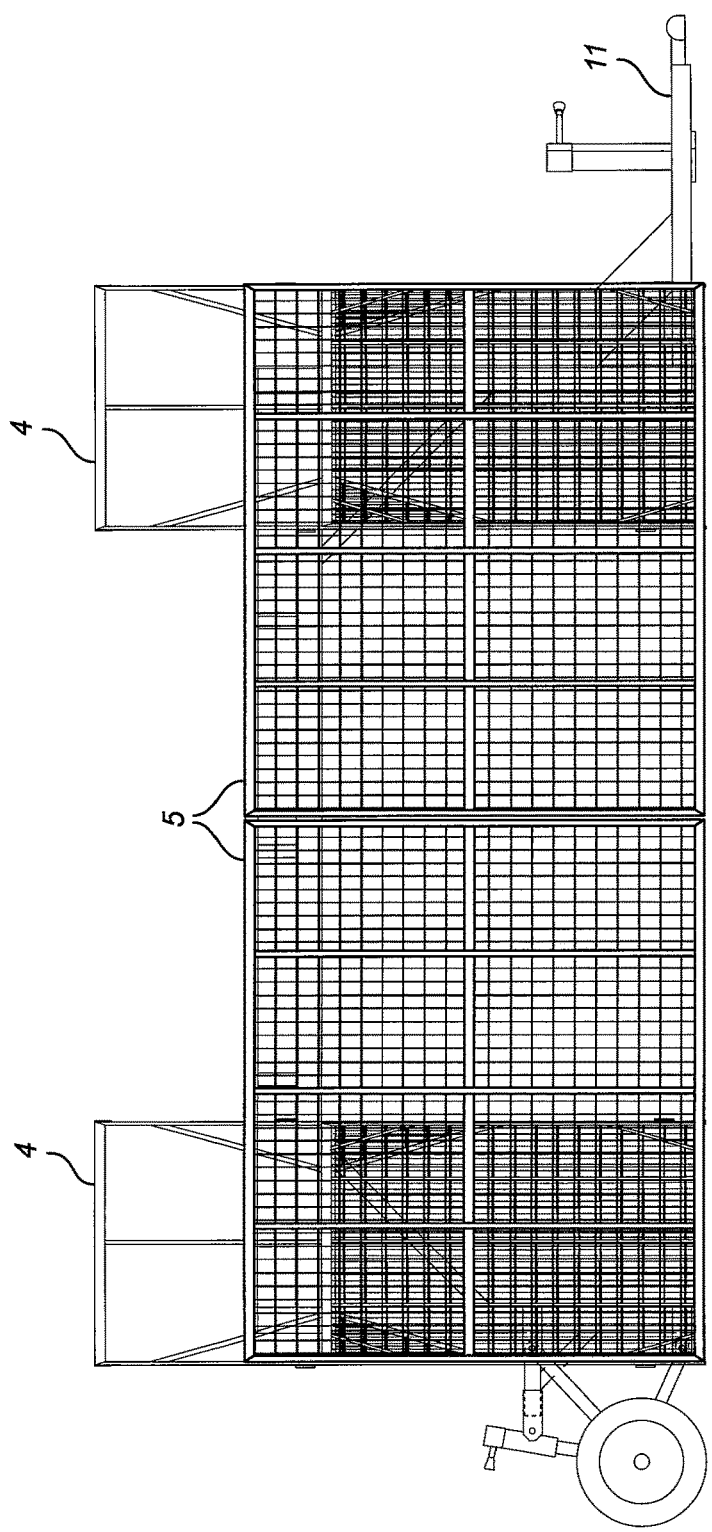
FIG. 8 is a left side elevation view of FIG. 6 thereof, with the right side elevation view being a mirror image of the left side elevation view.
Figure 9:
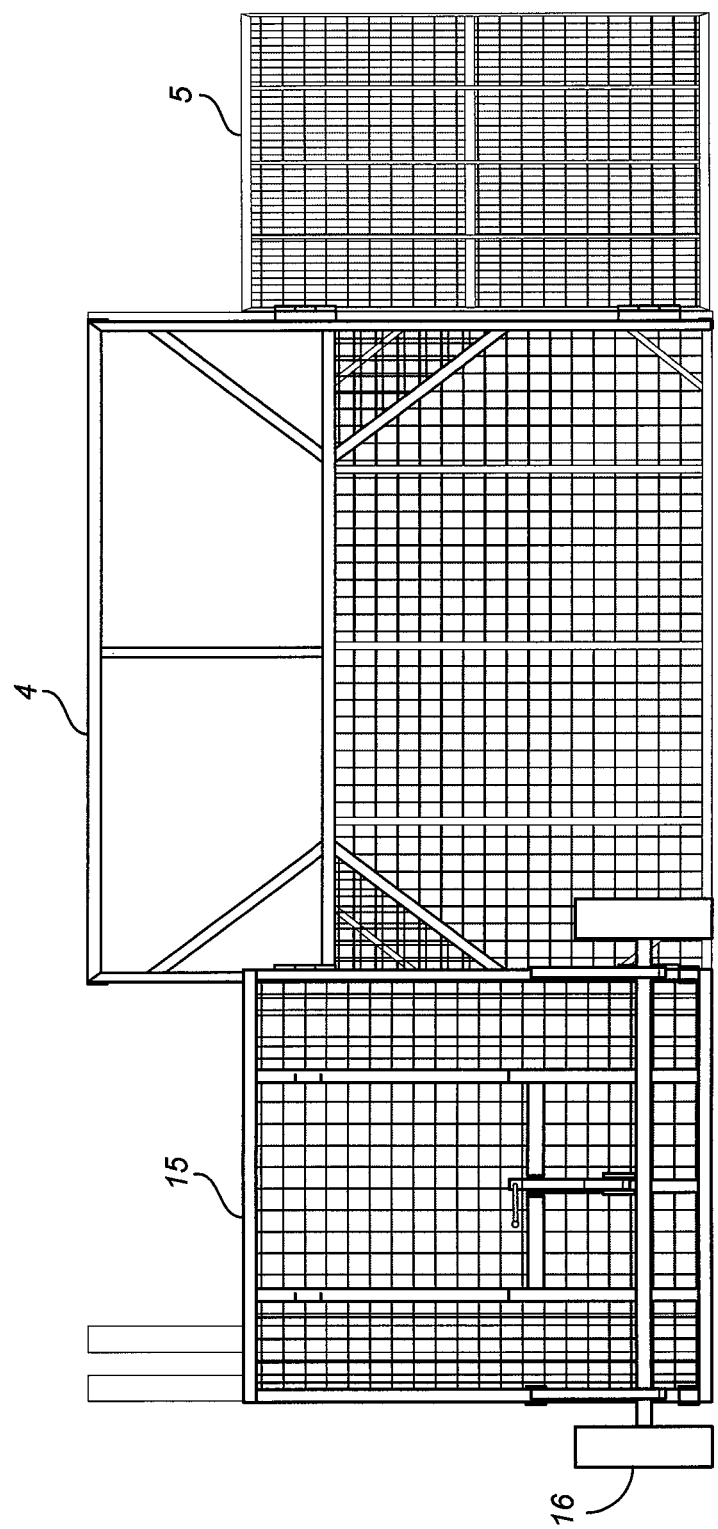
FIG. 9 is a rear elevation view of FIG. 6 thereof.
Figure 10:
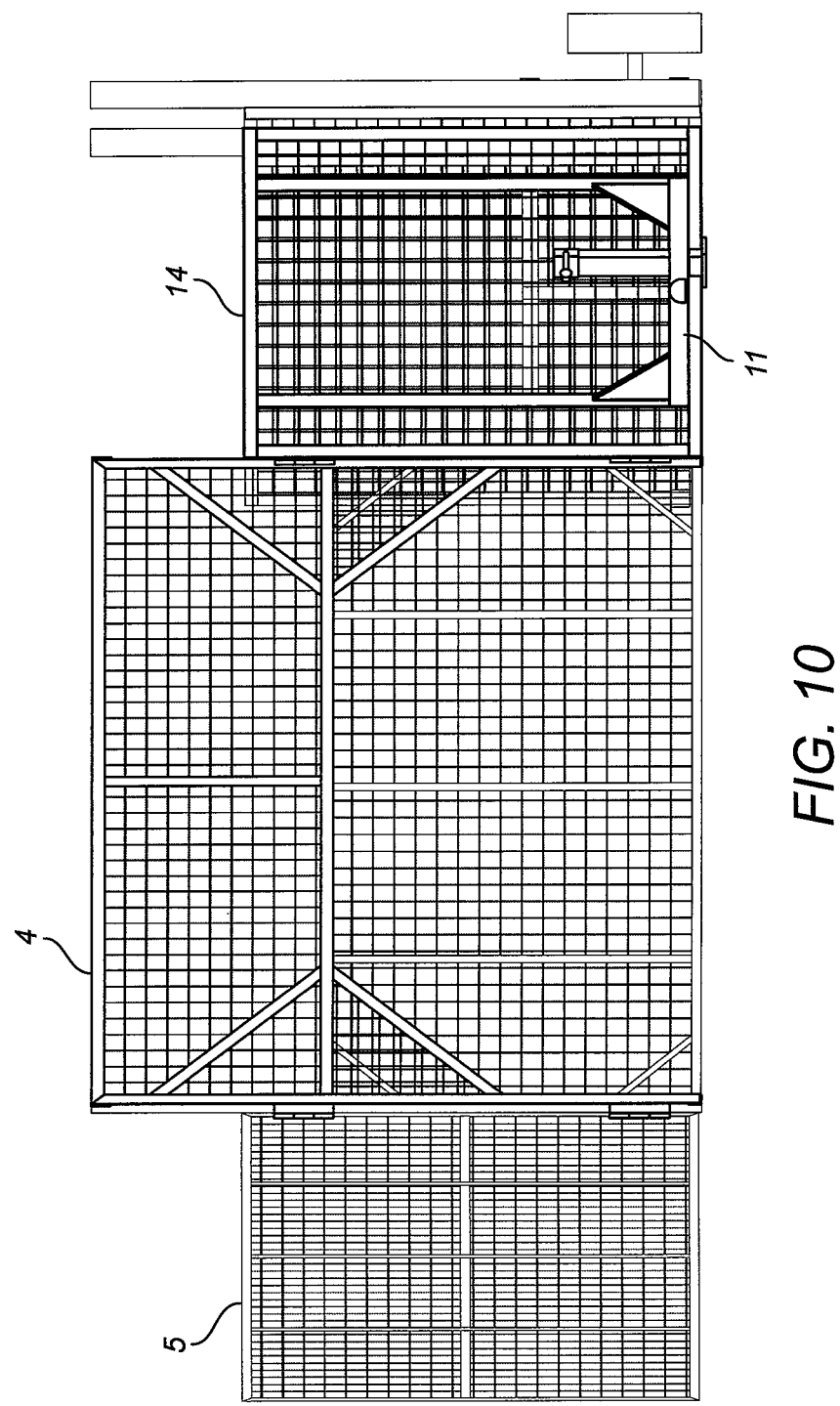
FIG. 10 is a front elevation view of FIG. 6 thereof.

In an embodiment as shown in FIG. 7, each panel assembly 3 includes an anchor panel member, multiple middle panel members, and a lead panel member. The structure of each panel member has a top, bottom, two opposing lateral sides, and at least one lining 10. Each panel member 5 may be made from 1½×1½×⅛ inch square tubing. In the embodiment shown in the drawing figures, the lining may be separated by tubing in a grid pattern, with the tubing spaced no more than 3 inches apart. The grid pattern of tubing provides additional structural support to the panel member. One advantage of the panel assembly 3 is that the panel members 5 may be extended outwardly and unfolded without the user being required to lift or otherwise drag the panel members 5 into position.

Each panel member 5 is made from a lightweight material. The material used for lining 10 of each panel member will depend on type of wildlife animals to be caught. Therefore, the apparatus 1 can be easily converted when capturing different kinds of wildlife animals. The lining of each panel member may be selected from the group consisting of netting, welded wire, any other flexible durable material, and combinations thereof. The netting may be selected from the group consisting of flexible netting, knotted netting, heavy duty netting, and combinations thereof. Each lining is detachably secured to the inside of a panel member with a hook, tie, wire, welded wire, or any other comparable temporary attachment or fastener. This lining arrangement assists in absorbing a substantial portion of the impact on the panel members by wildlife animals, particularly deer, hogs, geese, and other nuisance animals. Using netting as the lining is beneficial for withstanding the force of up to 800 lb/square inch upon the panel member. Knotted netting is preferred for the panel members and for the gate lining when capturing deer. The lining of each panel member in the grid pattern may be 2×4 inches. The lining may also be interchangeable for the middle section of any of the gates.

Each panel member 5 has at least one fastener and a plurality of hinges located on or near the lateral sides of the panel member so that the panel member can be replaced with another panel member or a gate. Therefore, the reference "anchor," "middle," or "lead" panel member refers to the location of a particular panel member or gate in the panel assembly. Each panel member 5 can be positioned upwardly or downwardly to line up to the next panel member or gate 4 in the configuration, and then secured with a fastener.

Each anchor panel member is hingedly connected to the support member 8 or to the respective end walls 14, 15 on the frame 2 at one lateral side of the anchor panel and hingedly connected to a first of the middle panels at the opposite lateral side of the anchor panel member.

Each middle panel member is hingedly connected on each of its lateral sides to another middle panel member. The first of the middle panel members closest to the frame 2 is connected to the anchor panel member. The last of the middle panel members farthest from the frame is connected to the lead panel member. As depicted in FIGS. 1-5, and 7, when disassembling the corral apparatus, the middle panel members are foldably stacked against each other until all of the collapsed the panel members abuts the anchor panel member. The collapsed panel members of the panel assembly are then further supported and secured to the frame 2.

Each lead panel member is the outermost panel member of the panel assembly. The lead panel member may be converted to a middle panel member by adding another panel member to the unattached lateral side of the lead panel member. FIG. 7 illustrates that the panel members unfold into a fan-shape configuration.

Preferably, each hinge or fastener for each panel member is made of a ¾ ID pipe with a ¾ solid round bar for pinning the panel members together. Alternatively, the hinges and the panel members may be made from a combination of different ways with different materials and sizes. Tolerances of ⅛ must be tighter for the present corral apparatus than on a typical cattle corral because some wildlife animals are smaller and more limber than robust cattle captured in other corrals. For example, there should be no more than 2 inches between the panel members to prevent a small piglet from escaping from between two panel members.

The anchor panel is pinned or otherwise mounted to the frame and secured with a pin or fastener, and is more particularly secured to the support member or to one of the end walls. The remaining middle panels and the lead panel are also pinned to each other with pins, hinges, or fasteners. When two lead panels of two separate panel assemblies meet, these lead panels can either be pinned or chained together. Alternatively, each lead panel member may be pinned to each respective end wall opposite the end wall supporting the anchor panel member of that panel assembly. The corral pens may be configured in any arrangement desired by the user. At least two corral pens are preferred. The pens can be expanded to nearly any desired size by adding more middle panels.

As depicted in FIG. 13, the apparatus 1 further includes a top cover to prevent certain wildlife animals from flying, leaping out, or escaping from the corral pen. The top cover comprises one or more netting or lining that is stretched from one area of the top of the panel members 5 to an opposite area of the top of the panel members 5. Alternatively, the top cover 6 comprises another set of a plurality of panel members. When netting is used for the top cover, the netting may be installed by clipping or pinning one section of the netting at any point along the panel members and to a top portion of the gate frame, preferably to a brace on the gate frame, then unrolling, unfolding, or stretching the netting to reach an opposite panel member. Once stretched, the netting is secured to the panel member(s) by clipping, zip tying, or pinning the netting to a section of the panel member(s). The height of top cover can be adjusted, as needed. The top cover can be in communication and controlled by the gate controlling means. When the top cover is one or more panel members, the panel members are capable of acting as horizontal drop panel members that can drop simultaneously upon command from a controlling means to a set height within the corral pen. The top cover allows the user to safely trap deer, or other wildlife animal, on the sides or to the ground, allowing the animals to be independently and physically restrained by a user by hand. The top cover is the width of the corral pen. During nonuse, transport, or storage, the top cover's panel members fold downwardly to abut one of the panel members 5 before the remaining panel members are folded and stacked toward the frame 2. When netting is used as the top cover, the netting is released from its respective fasteners then removed from over the panel assemblies.

Figure 12:
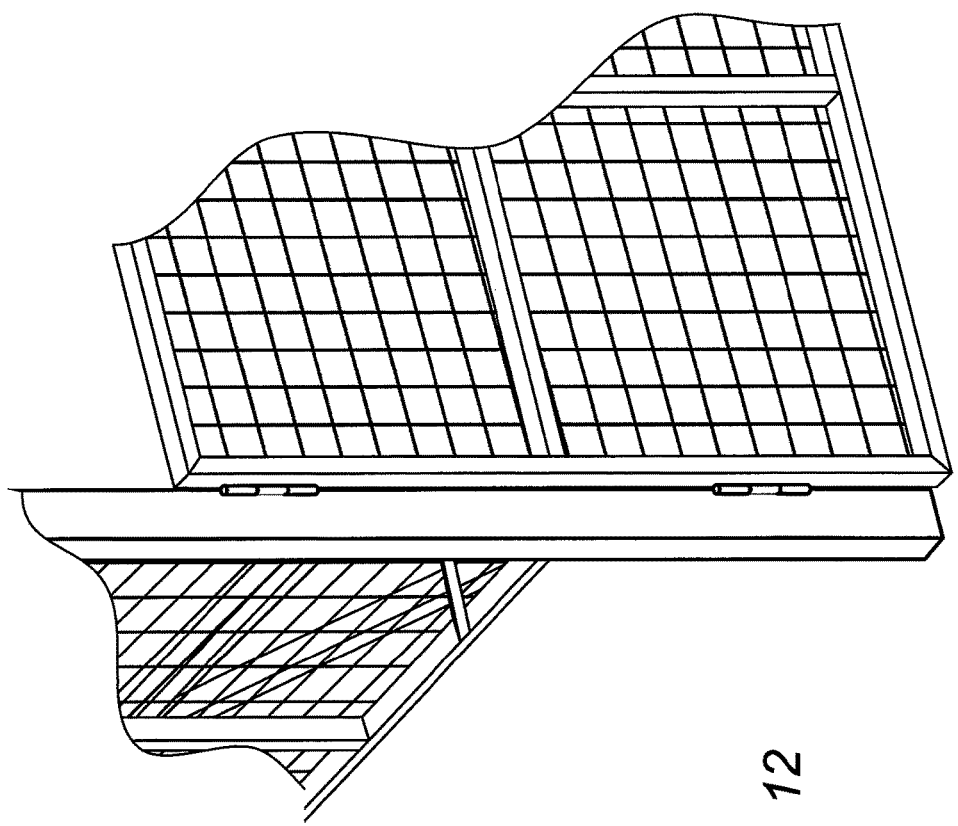
FIG. 12 is an exploded view of a portion of FIG. 11, showing a gate in an opened position and a panel member being hingedly connected together.

In FIGS. 6, 11, and 12, each gate assembly 4 includes an upstanding gate frame defining two opposing channels, a gate having a plurality of casters or rolling members slidable within the channels, a suspension means 17 for suspending the gate 4 in an upward and open position, a locking mechanism (not shown), and a controlling means (not shown) for remotely controlling said locking mechanism and the suspension means 17 for movement of the gate 4. Each gate assembly further includes a plurality of hinges and pins or fasteners for installing the gate assembly as an additional part, or as a substitution, of one of the panel members forming the arrangement of the panel assemblies. The gates are considered "drop gates" because, upon command from the user, each gate essentially "drops" quickly toward the ground to close off a portion of the corral pen, thereby preventing the captured wildlife from escaping.

In a preferred embodiment, each gate is a 2×6 foot structure. Gates having heights of at least 12 foot are preferred. These gates are larger than conventional wildlife gate traps and provide wildlife with a bigger opening to egress and ingress the corral pens. The sides of the gates may be made from 11 gauge 1½ inch square tubing. The structure of each gate further includes a top brace, a middle brace, a bottom brace, and lining. Each brace may be made from 11 gauge 1½ inch round tubing. Each gate utilizes a plurality of casters or rolling members to slidably travel upwardly and downwardly within the channels, facilitating movement of the gate into its opened and closed positions. Preferably, at least two casters are mounted on each lateral side of the gate to allow the gate to slidably travel upwardly and downwardly within the channels. There is a tight tolerance from the combination of the casters within the channel, along with the upward or downward movement of the gates, to maintain a balanced movement of the gate. The casters also prevent the gate from binding or snagging during movement within the channel.

The suspension means 17 includes winch assembly that rotates about its axis to lift all of the gates. A single winch assembly cooperates with the gate controlling means to selectively and independently lift and maintain the tension on one or more of the gates, as desired. The winch assembly includes a hook and pulley, a manual hand crank, or an electric winch and cable coupled to each gate. The winch and the cable provide tension upon each gate when each gate is raised and suspended in the air. In an embodiment, a 600# manual cable winch is mounted to or otherwise hinged on the gate frame. A 3/16 cable is used to manually pull the gate upwardly. Alternatively, an electric suspension means, particularly a 12-volt winch, may be used to suspend the gate above the ground in an open position.

The locking mechanism is a lever or a latch that cooperates with a lock or a stop. The locking mechanism that may be controlled by the controlling means, electrically or remotely, or by manual operation to lock the gate's position within the channels or to release the gate so it may slidably travel within the channels. In an embodiment, the locking mechanism is an electronic latch mounted near the center of the gate frame to assist the suspension means in holding and releasing the gate. Manual operation may include unfastening a latch to disengage a lock on the gate so that a user may manually open and close the gate.

The controlling means includes a receiver for remotely or wirelessly receiving a signal from a remote transmitter, a switch to actuate the suspension means to allow movement of the gate, and one or more relays employed with a sim card. The controlling means further includes a mobile phone booster antenna, at least one sim card, and at least one gsm relay. Solar technology, particularly, a solar charger or a plurality of solar panels, is the preferred power source for the apparatus' components. The remote or wireless controlling means also allows the user to actuate movement of the gate from several hundred yards away with a battery operated remote. This would be beneficial if the corral apparatus is stationed in an area without a sufficient signal and if the user is out of range. An accessible housing (not shown) contains the electronic components, including, without limitation, the power source, preferably a battery, gsm relay(s), sim card, other relays, solar charger, and mobile phone booster antenna. The housing may be located or mounted either near the front wall or the rear wall of the frame. The user transmits a signal to the sim card from a remote transmitter to power one of the relays, which in turn actuates the locking mechanism to disengage the latch to allow the gate to quickly close. The controlling means may be programmed with different coding so the user can selectively control which of the multiple gates, and the top cover, if applicable, should be closed. Each gate assembly has its own suspension means; however, each gate is selectively and remotely controlled by a single controlling means.

The arrangement of each panel assembly may be customized to include one or more gates installed with the plurality of panel members to create corral pens having different shapes and sizes. All panel members and gates are interchangeable, with the size of the corral pens being enlarged or reduced by adding or removing one or more panel members or gates. In one embodiment in FIGS. 6, 11, and 13, an apparatus has a first panel assembly having two gates and two panel members forming a first corral pen, and a second panel assembly having one gate and two panel members forming a second corral pen. When the gates are in a lowered or closed position, each gate is essentially treated as a panel member and can be folded and stacked with the remaining panel members as the panel assembly is closed to abut the frame.

In a further embodiment, the apparatus further includes one or more man gates 18 for easy egress and ingress by a user. The man gates may be located in any place on the apparatus. For example, man gates may be located on the front end of the frame, the rear end of the frame, and on any of the panel members. Each man gate may hingedly, rotatably, or slidably open and close for user access. The apparatus further includes one or more ladders (not shown), each of which may be incorporated into the structure of the man gate or independently mounted to any structural component of the apparatus to allow the user access to the top of the apparatus. Using a ladder is beneficial when installing the top cover over the panel members, or as needed, or to climb over the panel member.

The monitoring system includes a sensing means 13, a transmitting means (not shown), a receiving means (not shown), and a power source (not shown). The sensing means 13 is essentially a recording member, a motion sensor, and a heat detector. A video camera is a preferred recording member. In an embodiment, the motion sensor and heat detector are incorporated into, equipped on, or otherwise cooperates with the video camera. FIG. 6 depicts an embodiment wherein the sensing means is positioned on or near one of the frame's end walls. The camera also uses infrared or thermographic technology to aid in capturing and recording wildlife activity. Using a camera with infrared technology also avoids inadvertent flashes or other illumination that might spook or deter wildlife from interacting with the apparatus. The power source is a 12-volt battery that is kept charged by one or more reusable solar panels. The power source is electrically connected to the controlling means and to the sensing means to provide power for continued use.

The transmitting means is actuated by the sensing means and cooperates with the receiving means. The receiving means may be any electronic device having a display capable of viewing the images or video as received from the camera. The receiving means cooperates with the gate controlling means to operate movement of the gate remotely. As wildlife crosses the threshold of the corral entrance, the animals' movement is detected by the motion sensor and by the heat detector, thereby activating the camera to begin recording and taking still and moving images. The transmitting means transmits a signal to the receiving means monitored by the user. This transmission may occur simultaneously when the camera is activated, or a simple alert may be sent to the receiving means for the user to determine whether recorded images should be transmitted.

The apparatus 1 may further include a separate trap (not shown). This trap may contain live and/or animated decoy animals to attract the desired wildlife animals to enter the corral pen. The trap may be a separate cage that may be attachable to any part of the frame, or alternatively, it may be a standalone trap. Preferably, the trap is an approximately 3×5 foot enclosure. One of the main purposes for using the monitoring system with the apparatus is to use surveillance to know what kind of nuisance wildlife animals are being trapped. A purpose of the apparatus is to capture as many animals as possible at once, rather than catching only a few animals at a time. Catching a whole group of animals at one time prevents the animals from "trap shy" whereby the animals avoid engaging with the trap and entering the apparatus. For example, if only half the group of animals is caught while the other half becomes trap shy, then adequate population control would not be curtailed because the uncaptured animals can reproduce quickly. Another reason for the surveillance and monitoring system is that many wildlife animals are attracted to the same food source. It would be more difficult to distinguish which animals to detain and trap inside the corral pens without monitoring which kind of animal has entered the corral pen. For example, a corn bait will attract not only deer, but also wild hogs and raccoons. With the monitoring system, the user increases the opportunity to capture only one kind of animal at a time.

In another embodiment, the apparatus further includes a corn feeder barrel with a spin feeder set on a timer or a relay, preferably a gsm relay, to dispense feed to the animals. The corn feeder may be mounted on or near the rear of the frame. In an embodiment wherein the apparatus is used to capture wild pigs, the apparatus further includes a trap, such as a smaller pen, for holding a decoy animal. For example, the decoy animal can be a live Judas pig to attract wild pigs into the corral. The trap may be a 3×4 foot cage that can be pinned or permanently attached at or near the rear of the frame.

To use the portable wildlife corral apparatus, the apparatus is positioned in a desired location in the field, then the user lowers the frame toward the ground by separately engaging the front lifting means and rear lifting means. To form one of the corral sections or pens, the user pulls and hingedly extends one of the panel assemblies outwardly to unfold the panel members. As the lead panel member is moved away from the frame, the remaining middle panel members unfold with ease. The first lead panel member may then be connected to the other panel assembly's lead panel member, or the first lead panel member may be connected to the opposite frame end wall. The same procedure is implemented for the second panel assembly. A separate trap, along with its decoy animal, is positioned wherever desired in or near the apparatus. Also, during installation, the user may swap out any panel member for a gate, or vice versa, by unpinning the respective panel member, installing the gate, and pinning the gate to the panel assembly.

Each gate is suspended and locked into an open position, awaiting a drop command. The user activates the monitoring system, namely, the motion sensor and camera settings. When the desired wildlife enters the corral, the motion sensor will detect the presence of the wildlife and the camera will capture the images. A signal is transmitted to the user's remote display for review. When a suitable number or type of wildlife has filled the corral pen, the user transmits a signal to one or more of the gate controlling mean to drop the gate(s). This remote signal disengages the gate locking mechanism and releases the tension on the suspension means so the gate can quickly and slidably travel downwardly within the channels to cordon off the corral section.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An improved portable wildlife corral apparatus comprising:
   a. a frame comprising a front lifting assembly and a rear lifting assembly, each for independently and selectively lowering a front end and a rear end of said frame;
   b. at least one gate assembly comprising:
      i. a gate frame defining two opposing channels, with a lower portion of said gate frame defining a threshold gap spaced between said two channels to prevent an animal from being impeded as it enters a corral pen;
      ii. a drop gate comprising a plurality of rolling members slidable within each of said channels to facilitate upward or downward movement of said drop gate upon command;
      iii. a winch assembly operable with a controlling means to selectively and independently lift and maintain tension on said drop gate;
   c. two panel assemblies, each of said panel assemblies being extendable from and supported by said frame, each of said panel assemblies comprising a plurality of panel members, wherein an arrangement of each of said plurality of panel members that forms the corral pen is selectively interchangeable with respective plurality of panel members and one or more of said at least one gate assemblies,
   wherein said apparatus further comprising a closed position of the arrangement with the coupling of each of said plurality of panel members, and said gate frame with said drop gate, being foldable, stackable, and collapsible upon each other, said plurality of panel members against said frame while remaining coupled together, with each of said plurality of panel members and said gate frame being individually, and removably pinnable to an adjacent panel member or said gate frame;
   wherein said apparatus further comprising an opened position with each of the plurality of panel members and said gate frame with said drop gate, are individually unpinned from the adjacent panel member or gate frame, then being unfoldably extendable from the coupled respective adjacent panel member, said gate frame, or said frame while remaining coupled together respectively until the corral pen is arranged into a desired configuration;
   d. a monitoring system for sensing and alerting to the presence of wildlife animals entering the corral pen, and for transmitting an alert to a receiving means, said monitoring system comprising a recording member, a motion sensor, a heat detector, and a display, with said motion sensor and said heat detector each being operable with said recording member; and with said display for viewing images transmitted from said recording member;
   e. a controlling means for remotely controlling said drop gate, said controlling means comprising a switch and one or more relays, with said switch actuating said winch assembly for independently and selectively raising or lowering one or more of said drop gates;
   f. a top cover and a plurality of fasteners for fastening said top cover to one or more of said panel members or said drop gate, said top cover having at least one netting; said top cover controlled by said controlling means for selectively lowering said top cover onto or within said corral pen, to prevent wildlife from escaping over the top of said panel assemblies; and
   g. at least one power source having reusable solar technology for powering said monitoring system and said controlling means of said drop gate.

2. The corral apparatus of claim 1, said frame further comprising a front wall, a rear wall, a header anchored between said front wall and said rear wall, a towing assembly, and a rear wheel assembly; each of said plurality of panel members further comprising a lining being selected from the group consisting of netting, welded wire, any other flexible durable material, and combinations thereof, each of said lining being detachably connected to each of said respective plurality of panel members; said apparatus further comprising at least one man gate and at least one ladder.

3. An improved portable wildlife corral apparatus comprising:

a. a frame;
b. at least one gate assembly comprising:
  i. a gate frame having a horizontal cross member, with said gate frame defining two opposing channels, and with a lower portion of said gate frame defining a threshold gap spaced between said two channels for a threshold to prevent an animal from being impeded as it enters a corral pen;
  ii. a drop gate comprising a plurality of rolling members slidable within each of said channels to facilitate upward or downward movement of said drop gate upon command;
  iii. a winch assembly operable with a controlling means to selectively and independently lift and maintain tension on said drop gate;
c. at least one panel assembly extendable from and supported by said frame, said at least one panel assembly comprising a plurality of panel members, wherein an arrangement of each of the plurality of panel members forms the corral pen and is selectively interchangeable with respective plurality of panel members and one or more of said at least one gate assemblies, wherein said apparatus further comprising a closed position with the arrangement of each of said plurality of panel members, and said gate frame with said gate are foldable, stackable, and collapsible upon each other against said frame while remaining coupled together, with each of said plurality of panel members and said gate frame being individually, removably pinnable to an adjacent panel member or to said gate frame; wherein said apparatus further comprising an opened position wherein each of the coupled plurality of panel members and said gate frame with said gate, are individually unpinned from the adjacent panel member or said gate frame, then being unfoldably extended outwardly from the respective adjacent panel member, said gate frame, or said frame while remaining coupled together until the corral pen is arranged into a desired configuration;
d. a monitoring system comprising:
  i. a recording member, a motion sensor, and a heat detector, with said motion sensor and said heat detector for detecting the presence of at least one animal as the animal crosses said threshold gap under a raised said gate to enter the corral pen, and with the animal's movement into the corral pen, said motion sensor and said heat detector for activating said recording member to record animal's movement or position inside the corral pen; and
  ii. at least one transmitter and at least one receiver, with said at least one transmitter being actuated by activation of one or more of said recording member, said motion sensor, or said heat detector, wherein said at least one transmitter remotely transmits an alert to said at least one receiver for viewing by a user; and
e. a controlling means for remotely controlling said drop gate, said controlling means comprising a switch and one or more relays, with said switch actuating said winch assembly for independently and selectively raising or lowering one or more of said drop gates.

4. The corral apparatus of claim 3, said frame comprising an upstanding front wall, an upstanding rear wall, a header anchored between said front wall and said rear wall, a towing assembly, a rear wheel assembly, a front lifting assembly, and a rear lifting assembly, wherein said header having a first support member and a second support member, wherein the front and rear lifting assemblies operatively and independently lower a rear portion and a front portion of said frame after said apparatus is positioned at a desired location in the field.

5. The corral apparatus of claim 4, the arrangement of said plurality of panel members further comprising an anchor panel member, a plurality of middle panel members, and a lead panel member; said anchor panel member having a first side removably coupled to one of said frame front wall and rear wall, and a second side selectively, removably coupled to either one of the plurality of middle panel members or to said gate frame; each of said plurality of middle panel members have a first side and a second side that are each selectively, removably coupled either to said anchor panel member, to one of the said plurality of middle panel members, to said gate frame, or to said lead panel member; said lead panel member having a first side selectively, removably coupled either to one of the plurality of middle panel members or to said gate frame, and a second side removably coupled to one of said frame front wall and rear walls.

6. The corral apparatus of claim 3, said apparatus further comprising a top cover and a plurality of fasteners attaching said top cover to an upper perimeter of said corral pen to prevent wildlife from escaping over the top of said at least one panel assemblies; said top cover controlled by said controlling means for selectively lowering said top cover within the corral pen.

7. An improved portable wildlife corral apparatus comprising:
a. a frame comprising an upstanding front wall, an upstanding rear wall, a header anchored between said front wall and said rear wall, a towing assembly, a wheel assembly, a front lifting assembly, and a rear lifting assembly with each of said lifting assemblies independently and selectively lifting said frame or lowering said frame to the ground, and wherein said frame defines an unobstructed opening for opposing side walls and bottom of said frame;
b. at least one gate assembly comprising:
  i. a gate frame defining two opposing channels separated by a horizontal cross member, with a lower portion of said gate frame defining a threshold gap spaced between said two channels to prevent an animal from being impeded as it enters a corral pen;
  ii. a drop gate comprising a plurality of rolling members slidable within each of said two channels to facilitate upward or downward movement of said drop gate upon command; and
  iii. a winch assembly operable with a controlling means to selectively and independently lift and maintain tension on said drop gate;
c. at least one panel assembly comprising a plurality of panel members, with the plurality of panel members comprising an anchor panel member, a plurality of middle panel members, and a lead panel member; said anchor panel member having a first side removably coupled to one of said frame front or rear walls and a second side selectively, removably coupled to either one of the plurality of middle panel members or to said gate frame; each of said plurality of middle panel members having a first side and a second side each selectively, removably coupled either to said anchor panel member, to one of the plurality of middle panel members, to said gate frame, or to said lead panel member; said lead panel member having a first side selectively, coupled either to one of the plurality of middle panel members or to said gate frame, and a second side removably coupled to one of said frame front or rear walls;
  i. wherein an arrangement of each of the plurality of panel members forms a corral configuration and is selectively interchangeable with respective plurality of panel members and one or more of said at least one gate assemblies;
  ii. wherein said apparatus further comprising a closed position with the arrangement and coupling of each of the plurality of panel members and said gate frame with said gate are foldable, stackable, and collapsible upon each other against said frame front or rear walls while remaining coupled together, with each of said plurality of panel members and said gate frame, and with said frame ready for storage or transport when said apparatus is in the closed position; and
  iii. wherein said apparatus further comprising an opened position wherein each of the plurality of panel members and said gate frame with said gate are individually unpinned from an adjacent panel member or said gate frame, then unfoldably, extendable away from the respective adjacent panel member, said gate frame, or said frame front or rear walls while remaining coupled together, until the corral pen is arranged into a desired configuration;
d. a monitoring system comprising:
  i. a recording member, a motion sensor, and a heat detector, with said motion sensor and said heat detector for detecting the presence of at least one animal as the animal crosses said threshold gap under a raised said gate to enter the corral pen, and with the animal's movement into the corral pen, said motion sensor and said heat detector for activating said recording member to record animal's movement or position inside the corral pen;
  ii. at least one transmitter and at least one receiver, with said at least one transmitter being actuated by activation of one or more of said recording member, said motion sensor, or said heat detector, wherein said at least one transmitter remotely transmits an alert to said at least one receiver for viewing by a user; and
e. a controlling means for remotely controlling said drop gate after said monitoring system is activated, either automatically, after a predetermined event, or upon receipt of a command signal from the user, said controlling means comprising a switch and one or more relays, with said switch actuating said winch assembly for raising or lowering one or more of said drop gates.

8. The corral apparatus of claim 7, each of said plurality of panel members further comprising a lining detachably connected to each of said respective plurality of panel members.

9. The corral apparatus of claim 7, said monitoring system further comprising a display for viewing images transmitted from said recording member; and said apparatus further comprising at least one power source having reusable solar technology for powering both of said monitoring system and said controlling means of said drop gale; with said recording member having infrared technology; said motion sensor and said heat detector each in communication with said recording member.

10. The corral apparatus of claim 7, said apparatus further comprising a top cover having at least one netting, and a plurality of fasteners for attaching the top cover to an upper perimeter of said corral pen to prevent wildlife from escaping over the top of said at least one panel assembly; said top cover controlled by being in communication with said controlling means for selectively lowering said top cover within said corral pen.

* * * * *